Patented Sept. 8, 1925.

1,552,977

UNITED STATES PATENT OFFICE.

CLARENCE LOUIS ARNOLDI, OF MANITOWOC, WISCONSIN.

CHEESE-PRESERVING PROCESS.

No Drawing.   Application filed April 23, 1924.   Serial No. 708,356.

*To all whom it may concern:*

Be it known that I, CLARENCE LOUIS ARNOLDI, a citizen of the United States, and resident of Manitowoc, in the county of Manitowoc and State of Wisconsin, have invented certain new and useful Improvements in Cheese-Preserving Processes; and I do hereby declare that the following is a full, clear, and exact description thereof.

This invention relates to a process of preserving cheese.

This invention relates to a process of preserving cheese commonly known as cooked cheese, koch kaese, and sometimes known as Pennsylvania pot cheese. This cheese most readily spoils and is usually made for local consumption as it has been found impossible to store or keep this cheese for an indefinite period as the cheese rapidly develops bacteria.

This invention relates particularly to a process of preserving cheese of the above or similar type, in which the primary object is to preserve the cheese in its natural, fresh, palatable and wholesome condition, and to provide a process which may be very quickly carried out without requiring an extended period of time.

A further object of my invention is to provide a process of preserving a cheese which normally quickly spoils, which, when carried out, will permit the storing or keeping of the cheese for a great length of time without any detrimental effects whatsoever.

Further objects are to provide a process of preserving cheese made from skimmed milk or buttermilk so that this cheese which, as stated, is normally adapted only for local consumption may be kept indefinitely.

In carrying out this process, the cheese is manufactured from curd of skim milk or buttermilk or whole milk, and when in the state generally known as cottage cheese, it is put into a crock or pot or other suitable sanitary container and kept in a warm place. It is preferable to construct a curing room in which the temperature and humidity may be regulated to within a few points of the desired value. The exact temperature employed varies with the moisture contents, acidity and the firmness of the curd particles, however a temperature from 75° to 85° F. is found most suitable. The curd is stirred from time to time until a period of three to five days have elapsed depending upon temperature, water content, and acidity of the curd. During this process of curing, the granules of curd become covered with a gelatinous, sticky or substantially viscid mass which has been found to be a layer of semi-liquid curd with a strong characteristic odor and taste. This ripened or semi-liquid should not only form a layer around the curd particles, but should comprise substantially the entire curd itself. In fact, the entire mass of curd is gradually transformed into such semi-liquid state. This portion of the process I term the curing of the curd. When the curd has been cured it is placed in a vessel and boiled. It may be heated directly over the fire or may be heated by a steam jacket kettle or a water bath. This heating or cooking must be continued with a constant stirring or agitation until the entire mass is completely melted and is substantially homogeneous. I have found that the mass reaches this state at about 150 to 160° F. However, it may be heated to a slightly higher degree, but there is a possibility of obtaining a scorched flavor.

When the entire mass in the kettle is melted, the necessary salt, caraway or other flavor desired, may be added. It is also well, at this stage, to add butter or high percentage sweet cream. This added material is thoroughly stirred into the melted cheese. The cheese is now poured into containers and hermetically sealed. These containers are immediately placed in a revolving cage within the retort of a sterilizer. This is done before the contents of the cans or containers have cooled. The sterilizer may be of the type generally employed in milk canning factories. The cage is put into motion and boiling water turned on so that the cage is partially submerged. Steam is supplied the apparatus and the temperature of the retort is gradually raised to and maintained for a specified time at from 240 to 242° F. I have found that from 10 to 30 minutes is generally sufficient. The pressure in the retort should never exceed fifteen pounds per square inch. It is important that the temperature be maintained substantially uniform throughout the entire retort in order to secure perfect results.

The pressure in the retort is reduced as fast as possible and the water allowed to blow off or pass away. As soon as all of the water is out of the retort and the pressure completely relieved, cold water is turned on so that it splashes against the revolving cage and causes a quick and effective cooling. It is well to allow this water to run freely through the apparatus in order to insure a complete cooling of the cheese very rapidly. I have found that if the cheese is removed from the retort prior to its complete cooling that the albumen in the cheese will partially separate and this I avoid by completely cooling the cheese in a very rapid manner, as stated.

I have found that cheese prepared in this manner will keep indefinitely in these hermetically sealed cans, and that a very homogeneous cheese of fresh, palatable and tasty characteristics is insured. Further this process does not destroy the dietetic value as the nutritious nature of the product is maintained.

I claim:

1. The process of producing canned cooked cheese, which process comprises placing curds in open containers and allowing them to age, heating the resulting product at atmospheric pressure and in its own liquid until all of the particles are dissolved, running the resulting hot liquid into cans, hermetically sealing said cans, and sterilizing the sealed product by heat.

2. The process of producing canned cooked cheese, which process comprises securing curds by coagulation, placing the curds in open containers and allowing them to age, heating the resulting product at atmospheric pressure until a homogeneous liquid results, hermetically sealing the hot liquid in containers, immediately sterilizing the resulting sealed product by subjecting it to a higher temperature for a material length of time than that at which it was heated, and finally rapidly cooling the cheese.

3. The process of producing canned cooked cheese, which process comprises heating curds in their own liquid until the curds are completely dissolved, pouring the heated liquid into cans, hermetically sealing the cans while the contents are hot, and immediately sterilizing the sealed cans of cheese to a temperature of approximately 242° F. and immediately chilling the sealed cans.

In testimony that I claim the foregoing I have hereunto set my hand at Manitowoc, in the county of Manitowoc and State of Wisconsin.

CLARENCE LOUIS ARNOLDI.